March 2, 1971  J. J. AKCZINSKI  3,567,261
ADJUSTABLE SLIP JOINT
Filed Aug. 6, 1968
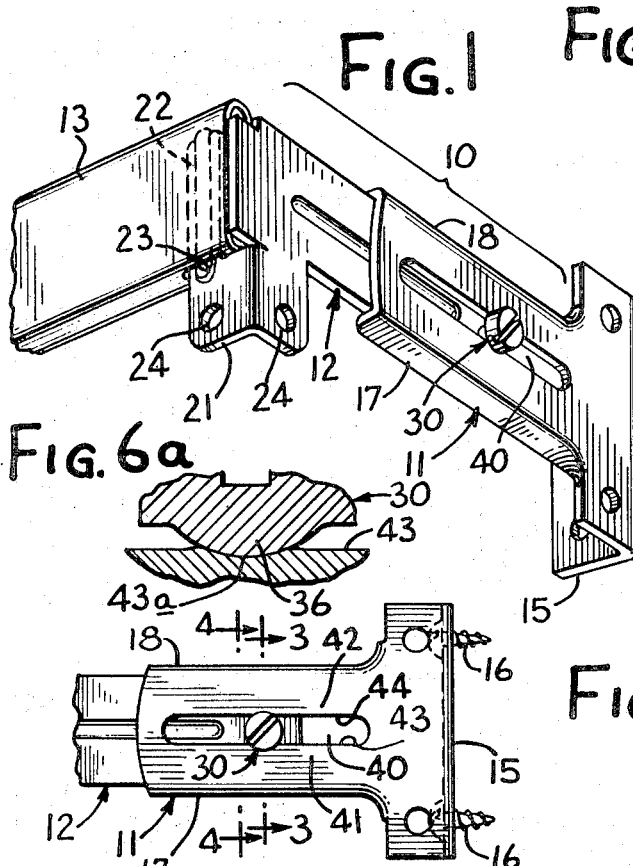
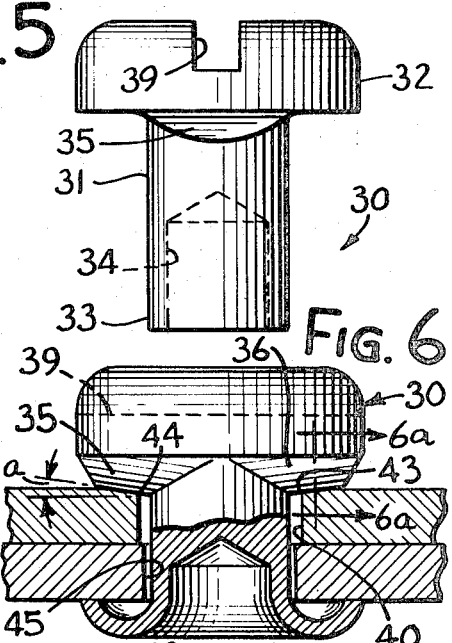
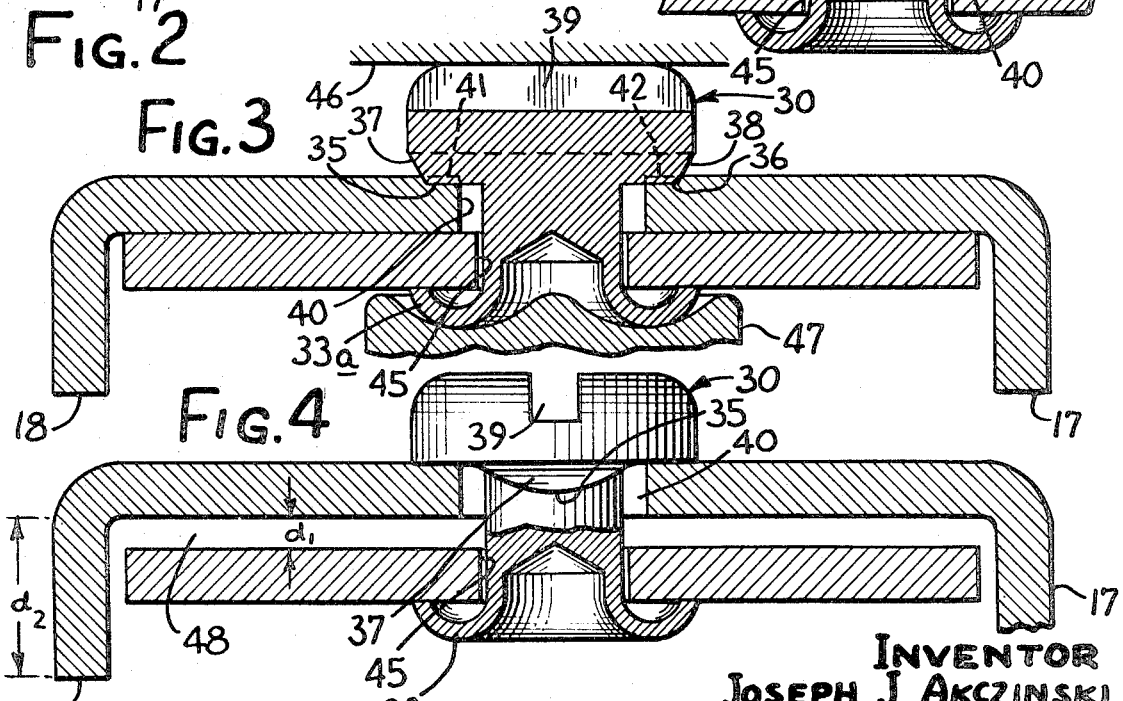
INVENTOR
JOSEPH J. AKCZINSKI
by: Wolfe, Hubbard, Voit & Osann
ATTYS.

United States Patent Office 3,567,261
Patented Mar. 2, 1971

3,567,261
ADJUSTABLE SLIP JOINT
Joseph J. Akczinski, Glen Burnie, Md., assignor to
Eastern Products Corporation, Baltimore, Md.
Filed Aug. 6, 1968, Ser. No. 750,608
Int. Cl. F16d *19/00*
U.S. Cl. 287—64                              4 Claims

ABSTRACT OF THE DISCLOSURE

A slip joint for adjustably connecting two members together including a rivet of special construction in which the head has a pair of radially alined cam surfaces on the underside and a screwdriver slot on the top so that the rivet can be turned between a tight condition in which the cam surfaces are crosswise with respect to a slot in one of the pieces and a loose condition in which the cam surfaces drop into register with the slot for readjustment of the effective length.

---

It is an object to provide a slip joint which is easily and quickly adjusted as to length or degree of projection and which is capable of holding its adjustment positively without risk of loosening upon passage of time or as a result of shock or vibration. It is another object to provide a slip joint which is readily released and retightened by a screwdriver or the like, rotated through an angle of only 90° and without applying more than casual tightening force. It is a related object to provide a slip joint construction in which the parts are relatively locked together by "brinelling" of the metal, i.e., by shallow deformation or notching of the metal at the edge of the slots as the rivet is turned to clamping position.

It is another object to provide a slip joint which makes possible economies in manufacture and assembly by substituting a rivet for the clamping screw usually provided and without necessity for modifying the two relatively slidable parts which are clamped together. Indeed, the parts may be simplified by the use of a simple hole in one of the pieces without necessity for tapping the metal. It is a related object to provide a loosenable adjusting arrangement for a pair of metal members which is easily assembled as a step in the manufacture and in which the parts are captive with one another so that there is no danger of loss during installation or adjustment, either by a professional installer or by a householder.

Other objects and advantages of the invention will become apparent upon reading the attached detailed description and upon reference to the drawings in which:

FIG. 1 is a fragmentary perspective view showing a curtain rod bracket embodying the present invention attached to a section of curtain or drapery rod;

FIG. 2 is a side elevation of the bracket shown in FIG. 1;

FIG. 3 is a section taken along the line 3—3 of FIG. 2 showing the rivet in its clamping position.

FIG. 4 is a corresponding view showing the rivet rotated 90° as it would appear looking along line 4—4 in FIG. 2;

FIG. 5 is an enlarged view of the rivet prior to installation and with the cam surface shown in profile;

FIG. 6 is an enlarged fragmentary view showing the engagement between the cams and the edges of the slot in a modification of the invention;

FIG. 6a is a fragmentary section taken along the line 6a—6a in FIG. 6 showing "brinelling" of the bracket metal; and FIG. 7 is a view similar to FIG. 6 and showing a still further modification employing an extra wide groove cooperating with chamfered surfaces at the ends of the cams;

While the invention has been described in connection with certain preferred embodiments, it will be understood that I do not intend to be limited to the particular embodiments shown and described but intend to cover the various alternative and equivalent constructions included within the spirit and scope of the appended claims.

Turning now to the drawing, there is shown a bracket 10 formed of a base portion or supporting member 11 and slide 12. Hooked onto the end of the slide is a curtain rod 13. The base portion 11 of the bracket has a mounting surface 15 secured to the wall by means of screws 16. The lateral edges of the mounting portion are inwardly turned forming flanges 17, 18 which define a longitudinal recess of shallow depth in which the member 12 is slidably nested and which prevents relative twisting between the two members. The outer end of the slide has a bent over portion 21 which includes an upstanding prong 22 which registers with a hole 23 at the end of the rod. Openings 24 are provided at the end of the slide for receiving drapery hooks on the curtain or drapery.

In accordance with the present invention the supporting member is provided with a longitudinal slot and the slide with a clearance hole, with a rivet for securing the two members together, the rivet head having a pair of alined cam surfaces integrally formed on its underside for engaging the lands on each side of the slot and the rivet further having a screwdriver slot or the like for rotating the rivet ninety degrees into a position in which the cam surfaces drop into register with the slot thereby to loosen the joint for readjustment. Referring to the drawing, the rivet, indicated by the numeral 30, has a shank 31, a head 32 and a peenable tip 33. To facilitate uniform peening of the tip the rivet is of hollow construction having an axial recess 34. Integrally formed on the underside of the rivet head are a pair of radially alined cams 35, 36, respectively terminating, at their outer ends in surfaces 37, 38. The cams 35, 36 are preferably of symmetrical shape, as shown in profile in FIG. 5, and may be considered as segments of a cylinder. For the purpose of rotating the rivet by means of a screwdriver or the like, a transverse slot 39 is formed in the top of the head alined with the cams 35, 36.

For relative adjustment a slot 40 is provided in the supporting member 11 bounded by land surfaces 41, 42 which terminate in sharp, ninety degree edges, 43, 44. The shank of the rivet passes through the slot and is received in a clearance opening 45 formed in the slide 12.

In carrying out the present invention, the rivet, after insertion, is rotated into an oriented position, as shown in FIG. 3, in which the alined cams 35, 36 are arranged crosswise with respect to the slot 40 so that the cams rest upon the lands 41, 42. With the rivet held in this position, and with the head supported on a suitable backup 46, a rivet setting tool 47 of conventional design is applied to the tip and either pressed, pounded or spun until the tip of the rivet is uniformly upset as indicated at 33a. A degree of force is applied which is sufficient not only to clamp the members 11 and 12 solidly together but to cause a slight degree of "brinelling" at the land surfaces. By "brinelling" is meant that the cams 35, 36 apply sufficient pressure to localized areas on the lands so that the lands are stressed beyond the elastic limit and "dimpled" or notched slightly. By overstressing the rivet sufficiently to cause the "brinelling," it is insured that when the rivet is subsequently loosened and retightened, in another position, sufficient clamping stress will be developed to produce a positive clamping force.

Subsequently, when it is desired to change the length or degree of projection of the bracket, either during initial adjustment or at a later time, a screwdriver is fitted into the screwdriver slot 39 and rotated through an angle of 90°. Such rotation swings the cams 35, 36 around into register with the slot 40 so that the cams "drop into" the slot, releasing clamping force and developing play as indicated at 48 (FIG. 4). The slide 12 may then be easily moved inwardly or outwardly to a new position, following which the head of the rivet is rotated another 90° causing the cams 35, 36 to ride up onto the land surfaces 41, 42, forcibly camming the members together with a high degree of mechanical advantage. The amount of mechanical advantage obviously depends upon the cam height and profile. A symmetrical, generally circular profile is found to work satisfactorily and enables clamping by rotation in either direction, although it will be apparent to one skilled in the art that the profile of the cams may be varied without departing from the present invention.

Since the screwdriver slot 39 is alined with the cams, the user is informed, by the crosswise position of the screwdriver slot, that maximum clamping effect has been achieved and that the rivet need not, therefore, be rotated beyond this position.

In accordance with one of the aspects of the present invention, the cam surfaces, instead of extending at right angles to the rivet axis, may be tapered at a shallow angle which is identified at $a$ in FIG. 6. Thus when the rivet is rotated from its loosened position shown in FIG. 4 into the clamping position shown in FIG. 6, stress is concentrated along the sharp edges 43, 44 which bound the slot. Since the cross section of the cams 35, 36 is greater, at the point of contact, than the engaged sharp edges, the sharp edges are deformed by brinelling action into accommodating notches which register with the cams as indicated at 43a in FIG. 6a. Such notches prevent any subsequent endwise movement of the rivet head, and hence of the slide 12 with respect to the base portion 11, until such time as the rivet is loosened by a further 90° rotation. While this mode of clamping leaves permanent shallow notches along the edges of the slot, it may be noted that the adjustment, once made, is usually retained for the life of the installation so that the portion 11 of the bracket is not visibly defaced.

As a still further mode of positive locking, the slot 40 may be made wider as shown in FIG. 7 and the ends 37, 38 of the cams may be intentionally chamfered to engage the sharp edges 41, 42. Thus when the rivet is rotated into its clamping position, the ends 37, 38 are brought forcibly to bear against the sharp edges 43, 44 producing a high per unit pressure sufficiently great to slightly brinell or notch the corners locking the rivet in position and preventing endwise movement in the slot.

It is found that even when the rivet is not especially hardened, the engaging cam surfaces are of sufficient cross section so that it is the sharp edge of the slot which is notched or deformed and not the rivet itself. However, if desired, the rivet 30 may be selectively hardened so that the head and the integral cams thereon are substantially harder than the soft steel of which the bracket itself is made. The tip 33 of the rivet should be locally annealed so that it remains soft enough to be peened, or upset, by the conventionally used upsetting tool. The rivet, with its novel features, may be manufactured and sold separately from the bracket as an article of manufacture for use in other specific types of brackets not shown. All that is necessary is that the two portions, which are to be held together, be provided respectively with a slot and a registering rivet hole. The use of the present rivet, as a fastener, does not require any substantial modification of the bracket construction which is usually employed with a clamping screw. Indeed, the construction is simplified since, instead of a tapped hole in the slide 12 for threaded engagement of the screw, only a clearance opening sufficient to admit the rivet shank is necessary.

It is one of the features of the construction that the amount of "play," axially of the rivet, when the rivet is in its loose condition, determined by the throw of the cam, and which is indicated in the drawings as $d_1$, is less than the height of the flanges 17, 18, indicated in the drawings as $d_2$. Thus even though the rivet may be fully loosened, the slide 12 will always remain captive in its alined and load-supporting position. This is to be contrasted with prior constructions in which loosening of the clamping screw is sufficient to allow the slide to slip out of its channel and to swing downwardly under the load, often heavy, imposed by the draperies and resulting in the rod 13 being severely twisted. Indeed, with a few additional turns, a conventional clamping screw may be completely dislodged, allowing the slide and rod, with its supported load, to fall to the floor, to say nothing of the nuisance of the loss of the screw. The fact that the rivet holds the parts captive at all times is also of advantage in packaging for shipment to insure that all of the parts are enclosed and minimizing the number of parts which must be assembled together when the package is opened.

One skilled in the art will appreciate that the present invention has its method aspects. In assembly, the parts 11, 12 are placed face to face, the rivet is inserted and rotated crosswise to the slot. It is then held in this orientation during the time that the peening or setting of the rivet is taking place and with the force applied to the rivet being increased to the point where the cams slightly indent or brinell the land surfaces along the edge of the slot. Consequently, when the rivet is subsequently loosened and retightened, the clamping force will be at least sufficient to positively hold the parts together. By elevating the setting force beyond the point of slight or incipient brinelling, the manufacturer may be assured that rebrinelling will take place, with positive locking action, whenever the device is readjusted in the hands of the user.

The term "rivet hole" used in the following claims is intended to include any clearance opening through which the tip of the rivet is inserted and over which it is peened. Thus it will be apparent that both members may be provided with a narrow slot for adjustment purposes without departing from the invention; but in the latter event it will be desirable to apply a washer to the tip prior to the peening operation.

While the invention has been described in connection with a curtain rod, it will be understood that the invention is by no means limited thereto but has application wherever two members are to be connected together with a rivet capable of loosening by rotation through an angle. Also while the term "slip joint" has been used for the sake of convenience, it will be understood that the slip referred to has to do with relative motion which need not, necessarily, be movement in a straight line. It is conceivable, for example, that the flanges 17, 18 might be omitted in certain applications of the present invention to provide relative scissoring between the connected members with provision for clamping the members in a desired angular relationship simply by turning the rivet crosswise with respect to the slot under the rivet head. Also it will be apparent that while an elongated slot 40 has been shown and described, such slot need not be made as long as shown, particularly where angular movement is desired, and indeed the slot may be shortened to a length which is simply adequate to accommodate the cams when the rivet is turned to its alined or loosened position, without departing from the broader aspects of the present invention.

Finally, while the term "slot" has been employed in the claims, the term in its broadest sense implies a relief for accommodating the cam surfaces and hence it is intended that the term be interpreted to include a relief which does not extend all the way through the member, in other words, a groove.

I claim:

1. In an adjustable slip joint, the combination comprising a member having an elongated slot of constant width bounded by land surfaces, a slidable member positioned flatly thereagainst having a rivet hole alined with the slot, a rivet having a shank extending through said slot and hole including a head at one end and a peenable tip at the other for clamping the two members together with the head on the side of the slotted member and with the tip being peened over the rivet hole and with said head being sufficiently larger than said elongated slot in any radial direction of said head so that the members are permanently maintained captive with one another, the rivet having a pair of integral radially alined cams formed on the underside of the head and bearing against the respective land surfaces to apply clamping force thereon, the head of the rivet being formed with tool-receiving surfaces for turning engagement by a tool so that upon turning through ninety degrees of rotation the cam surfaces drop into register with the slot thereby to loosen the joint for readjustment and so that upon a further ninety degrees of rotation, the cams ride up on the lands of the slot for clamping the members in a new position relative to one another, said rivet tool-receiving surfaces being positioned in phase alignment with the cams on the underside of the head so that turning of the tool-receiving surfaces to a position crosswise of the adjacent visible positions of the slot indicates to the user when the rivet occupies its full clamping position.

2. In an adjustable slip joint, the combination comprising a member having an elongated slot of constant width bounded by land surfaces, a slidable member positioned flatly thereagainst having a rivet hole alined with the slot, a rivet having a shank including a head at one end and a peenable tip at the other end for clamping the two members together with the head on the side of the slotted member and with the tip being peened over the rivet hole, the rivet having a pair of integral radially alined cams formed on the underside of the head and bearing against the respective land surfaces to apply clamping force thereon, the head of the rivet being formed for turning engagement by a tool so that upon turning through ninety degrees of rotation the cam surfaces drop into register with the slot thereby to loosen the joint for re-adjustment and so that upon a further ninety degrees of rotation, the cams ride up on the lands of the slot for clamping the members in a new position relative to one another, the slot in the slotted member being of a width slightly less than the diameter of the rivet head and the ends of the cams being inwardly chamfered beginning at the periphery of the head so that the chamfered end of at least one of the cams engage the corner of the adjacent edge of the slot for brinelling of the metal of the corner to form a notch therein thereby to positively position the rivet with respect to the slot as the cams are turned crosswise of the slot to prevent subsequent slippage of the members with respect to one another.

3. In an adjustable slip joint, the combination comprising a base member having an elongated slot of constant width bounded by land surfaces, a slidable member positioned flatly thereagainst having a rivet hole alined with the slot, one of the members having lateral flanges to define a longitudinal recess of shallow depth, the other member being fitted for sliding in the recess, a rivet having a shank extending through said slot and rivet hole including a head at one end and a peenable tip at the other for clamping the two members together with the head on the side of the slotted member and with the tip being peened over the rivet hole, said head being sufficiently larger than said elongated slot in any radial direction of said head so that the members are maintained permanently captive with one another, the rivet having a pair of integral radially alined cams formed on the underside of the head and bearing against the respective land surfaces to apply clamping force thereon, the head of the rivet being formed with tool receiving surfaces for turning engagement by a tool so that upon turning through ninety degrees of rotation the cam surfaces drop into register with the slot thereby to loosen the joint for readjustment and so that upon turning through a further ninety degrees of rotation, the cams ride up on the lands of the slot for clamping the members in a new position relative to one another, the throw of the cam being less than the depth of the recess so that the fitted member is securely maintained in the recess notwithstanding the loosening of the rivet.

4. The method of assembling a slotted member and a relatively slidable member having a rivet hole using a rivet having radially alined projecting cam surfaces on the underside of its head as well as a shank and tip, which includes the steps of inserting the rivet through the slot and thence through the hole, rotating the rivet head to an oriented position in which the cam surfaces are crossways of the slot, and peening the tip of the rivet over the hole until the point of incipient brinelling of the slotted member is reached while maintaining the rivet in its oriented position.

References Cited

UNITED STATES PATENTS

| | | | |
|---|---|---|---|
| 481,566 | 8/1892 | Hunter | 85—5 |
| 522,247 | 7/1894 | Wilson | 85—37UX |
| 1,385,799 | 7/1921 | Smith | 85—37 |
| 1,402,979 | 1/1922 | Townsend | 85—5UX |
| 2,041,809 | 5/1936 | Bernhard | 287—58 |
| 2,096,598 | 10/1937 | Sheane | 85—9X |
| 2,555,291 | 5/1951 | Poupitch | 85—5UX |
| 2,998,955 | 9/1961 | Hertzog | 248—265X |
| 3,030,060 | 4/1962 | Breuer | 248—265 |
| 3,430,908 | 3/1969 | Kowalczyk | 248—265 |

REINALDO P. MACHADO, Primary Examiner

A. V. KUNDRAT, Assistant Examiner

U.S. Cl. X.R.

248—265